(12) United States Patent
Kirschbaum

(10) Patent No.: US 8,944,011 B2
(45) Date of Patent: Feb. 3, 2015

(54) IMPACT ACTION CAT TOY

(71) Applicant: Phillip Graham Kirschbaum, Petaluma, CA (US)

(72) Inventor: Phillip Graham Kirschbaum, Petaluma, CA (US)

( * ) Notice: Subject to any disclaimer, the term of this patent is extended or adjusted under 35 U.S.C. 154(b) by 0 days.

(21) Appl. No.: 13/815,101

(22) Filed: Jan. 31, 2013

(65) Prior Publication Data

US 2014/0209037 A1 Jul. 31, 2014

(51) Int. Cl.
*A01K 15/02* (2006.01)
*A01K 29/00* (2006.01)

(52) U.S. Cl.
CPC .................................. *A01K 15/025* (2013.01)
USPC .......................................... 119/708; 119/707

(58) Field of Classification Search
USPC .......... 119/708, 707, 702; 446/486, 247, 266, 446/409, 411
IPC .................................. A01K 15/02,15/00, 29/00
See application file for complete search history.

(56) References Cited

U.S. PATENT DOCUMENTS

| | | | | |
|---|---|---|---|---|
| 5,111,771 | A * | 5/1992 | Mathews | 119/708 |
| 5,474,032 | A * | 12/1995 | Krietzman et al. | 119/708 |
| 6,318,300 | B1 * | 11/2001 | Renforth et al. | 119/708 |
| 6,892,675 | B1 * | 5/2005 | Comerford | 119/708 |
| 7,115,051 | B2 * | 10/2006 | Hansberry | 473/423 |
| 7,543,550 | B2 * | 6/2009 | Simpson | 119/708 |
| 8,181,606 | B1 * | 5/2012 | Kirschbaum | 119/708 |
| 8,640,653 | B2 * | 2/2014 | Cook et al. | 119/708 |

* cited by examiner

*Primary Examiner* — Son T Nguyen
*Assistant Examiner* — Kathleen Alker

(57) ABSTRACT

An impact action cat toy with a rigid tube, an elastic cord, an elastic cord retainer, an elastic and non-elastic cord retainer and a cat toy play member. The elastic cord is retained inside the rigid tube and terminates on one side in the elastic cord retaining member and on the opposite side in the elastic and non-elastic cord retaining member. The non-elastic cord terminates on one side in the elastic and non-elastic cord retaining member and on the opposite side in the cat toy play member. The cat toy play member quickly and erratically flies into the air when a user holds onto the rigid tube with one hand and stretches the elastic cord member from the elastic and non-elastic cord retaining member with the other hand and releases the retaining member causing it to snap back and impact the end of the rigid tube.

2 Claims, 3 Drawing Sheets

IMPACT ACTION CAT TOY

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of cat toys and more specifically to an impact action cat toy.

Cat's who live in a home environment enjoy practicing their hunting skills by chasing after erratically moving items whether they be real—such as mice, or artificial, such as a cat toy that is operated by the cat's owner to imitate the erratic action of a mouse or other naturally occurring small animal. Numerous cat toys have been designed and manufactured to fill this need.

However, most of those toys do not provide a high degree of instantaneous and quick movement that cats love so much. Simple cat toys that dangle from a string can be dragged and flown by the user but require a great deal of effort on the user's part, and even then, the action is not necessarily lightning fast because a person's hand and arm can only move to a certain degree of speed and no further. What is needed is a cat toy that includes a novel way to produce a truly instantaneous movement and that is very simple and economical to manufacture.

BRIEF SUMMARY OF THE INVENTION

The primary object of the invention is to provide an impact action cat toy that causes a play object to suddenly and erratically jump into the air.

Another object of the invention is to provide an impact action cat toy that is constructed in a simple and economical manner.

Another object of the invention is to provide an impact action cat toy that allows the impact action to be repeated quickly.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an impact action cat toy comprising: a rigid tube, an elastic cord, a first elastic cord retaining member, a second elastic and non-elastic cord retaining member, a non elastic cord and a cat toy play member, said elastic cord slidably retained inside said rigid tube, said elastic cord terminating on one side in said first elastic cord retaining member, said elastic cord terminating on the opposite side in said second elastic and non-elastic cord retaining member, said non-elastic cord terminating on one side in said elastic and non-elastic cord retaining member and on the opposite side in said cat toy play member, said cat toy play member being constructed of light weight materials, and said cat toy play member being caused to quickly and erratically fly into the air while tethered on said non-elastic cord when a user holds onto said rigid tube with one hand and with the other hand stretches said elastic cord member by pulling on said elastic and non-elastic cord retaining member and suddenly releasing said retaining member causing said retainer to impact the end of said rigid tube causing said cat play toy to fly into the air in a quick and erratic manner.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
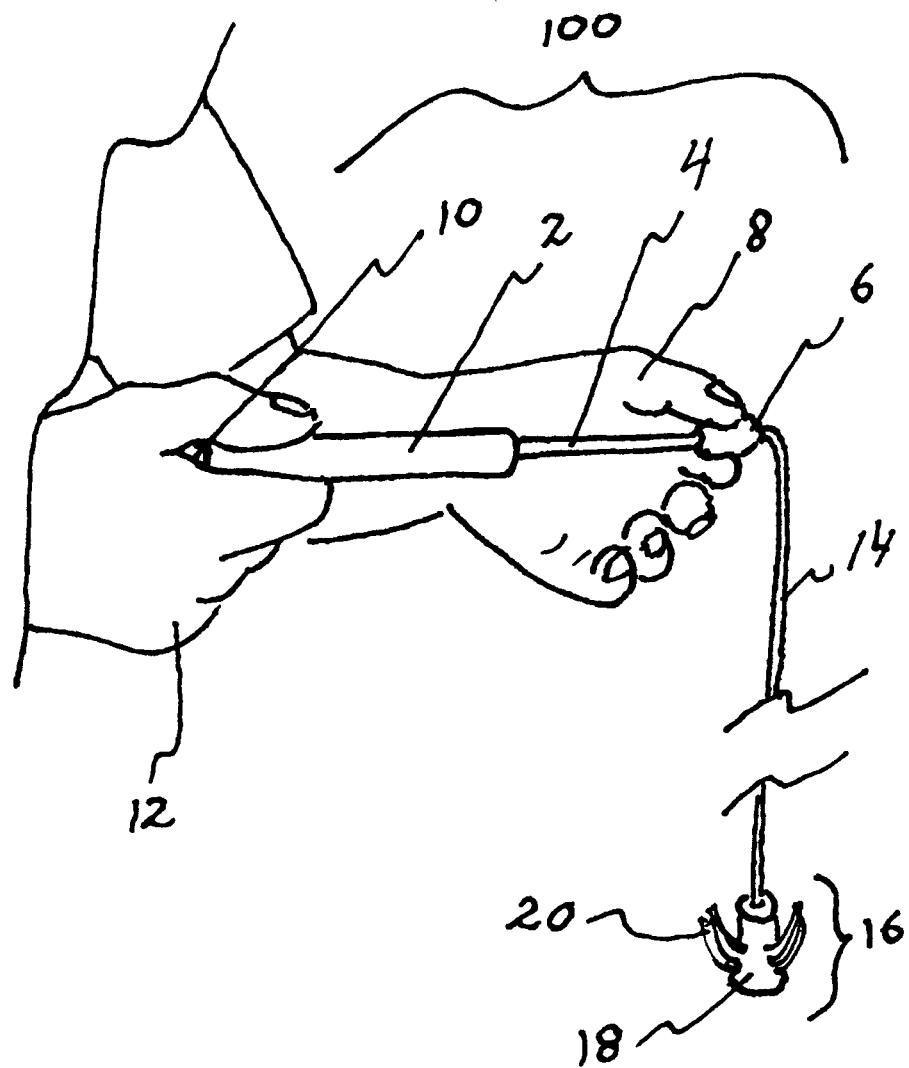
FIG. 1 is a perspective view of the invention while the user is pulling on the elastic and non-elastic cord retainer in preparation to cause the cat toy to quickly jump in an erratic manner.

Referring now to FIG. 1 we see a perspective view of the invention 100. A rigid tube slidably holds an elastic cord within it as shown in the side section view in FIG. 2. The elastic cord terminates on one side in an elastic cord retaining member 10 and on the opposite side in an elastic cord and non-elastic cord retaining member 6. A person is holding the rigid tube 2 with one hand 12 while pulling on the elastic and non-elastic cord retaining member 6 with the other hand 8 causing the elastic cord member 4 to partially exit one side of the tube 2. The non-elastic cord terminates on one side in the elastic and non-elastic cord retaining member 6 and on the opposite side in a cat play toy 16. The cat play toy in this case is comprised of a cork 18 with feathers 20 fixedly attached. Other light objects can be used in place of the cork including a hollow ball or simply feathers gathered together by a retaining member. The key is that the toy 16 be very light and that it include features that are appealing to cats, such as feathers 20.

Figure 2:
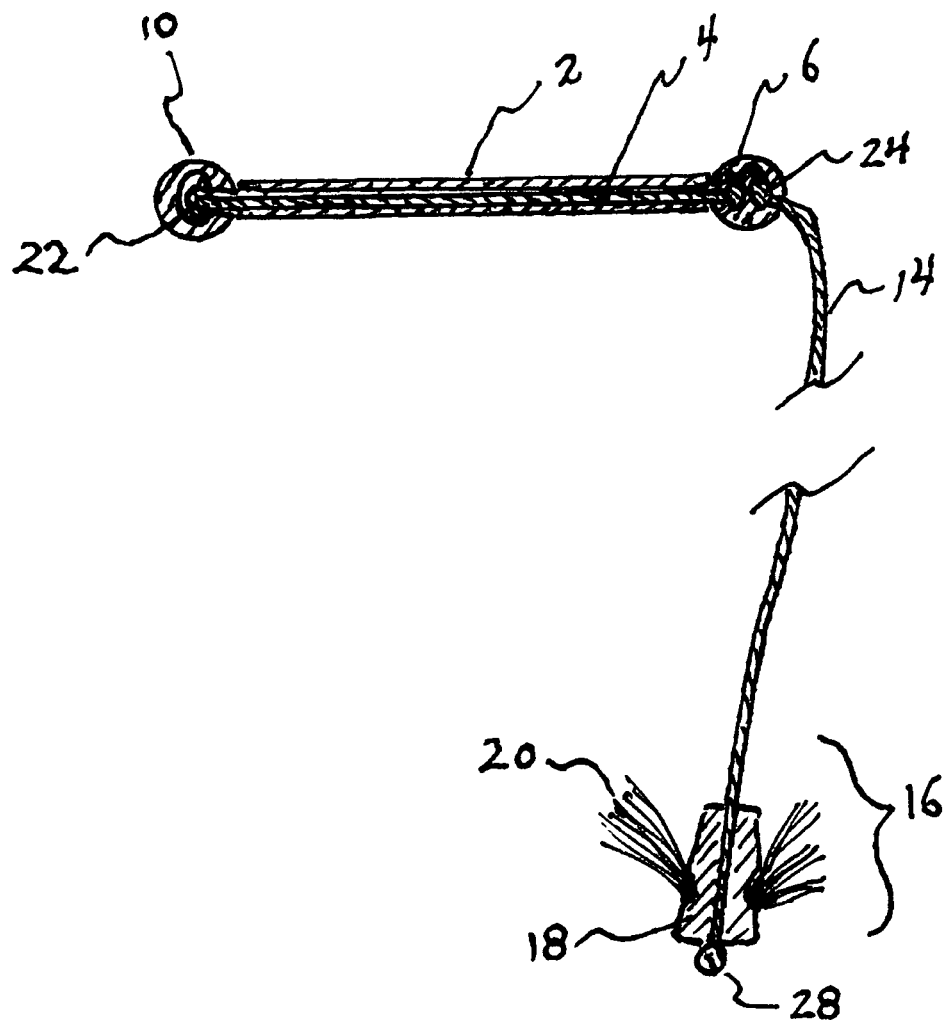
FIG. 2 is a section view of the cat toy of the present invention.

FIG. 2 shows a side section view of the rigid tube 2. The elastic cord 4, otherwise known as a bungee cord, is slidably retained within the tube 2. A knot 22 at one end of the elastic cord holds the cord 4 from escaping from the retainer 10. A knot 24 at the opposite end of the cord 4 keeps it from escaping from the elastic and non-elastic cord retainer 6. A knot in the non-elastic cord also is trapped within cord retainer 6 and keeps the non-elastic cord 14 from leaving the retainer 6. The non-elastic cord terminates at the opposite end in play toy 16 where it is fixedly held by knot 28. Feathers 20 are fixedly attached to the cork 18.

Figure 3:
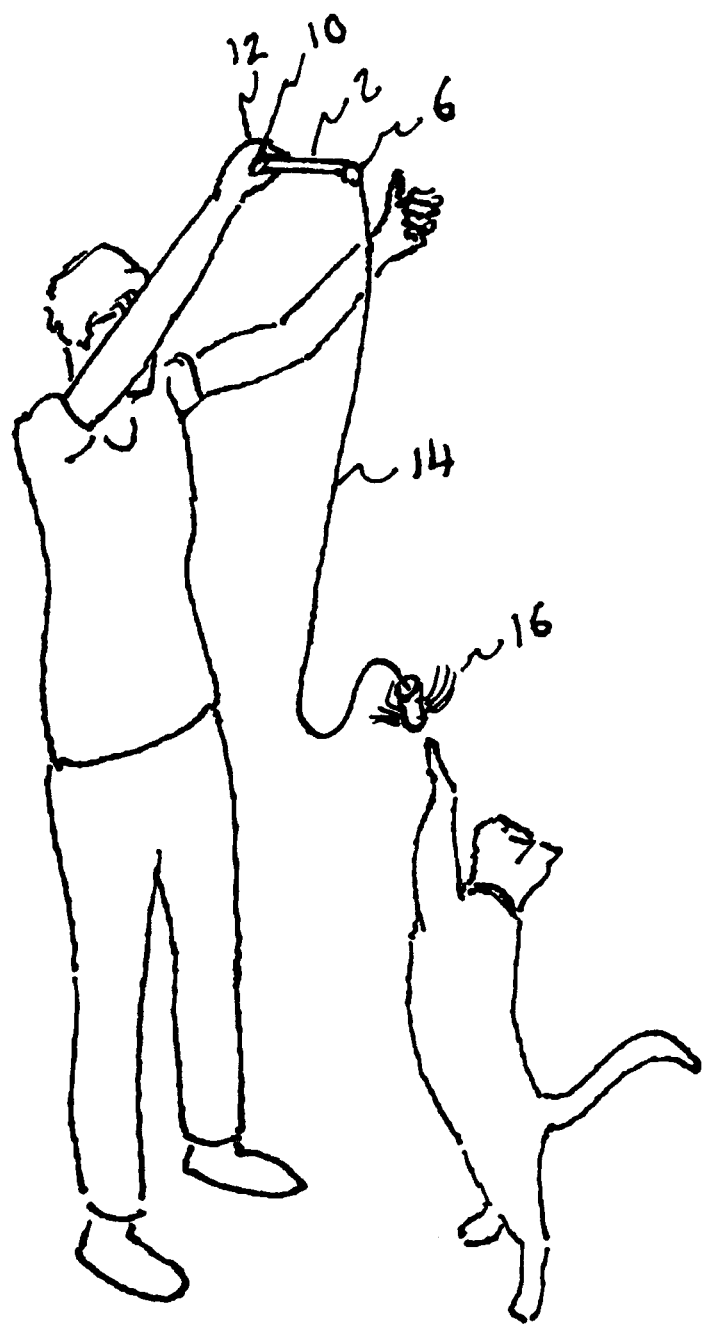
FIG. 3 is a perspective view of the cat toy in use just after the high impact reaction of the cord retainer snapping back after being pulled by the user.

FIG. 3 is a perspective view of a person has released the elastic and non-elastic retaining member 6 and it has snapped back to the end of rigid tube 2. This snapping action produces a novel impact effect where the cat toy 16 is caused to instantaneously and quickly jump into the air in an erratic manner. This type action that is extremely appealing to cats, even the oldest and most tired of cats. Additionally, the clicking noise of the retaining member 6 hitting the rigid tube 2 is attractive to cats. Experiments show that by making the clicking noise, cats come running because they know that the impact cat toy 100 is in operation.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Impact action cat toy comprising
   a rigid tube;
   an elastic cord;
   an elastic cord retaining member;
   an elastic and non-elastic cord retaining member;
   a non elastic cord; and
   a cat toy play member;
   said elastic cord slidably retained inside said rigid tube;
   said elastic cord terminating on one side in said elastic cord retaining member;
   said elastic cord terminating on the opposite side in said elastic and non-elastic cord retaining member;
   said non-elastic cord terminating on one side in said elastic and non-elastic cord retaining member and on the opposite side in said cat toy play member;
   said cat toy play member being constructed of light weight materials; and
   said cat toy play member caused to quickly and erratically fly into the air while tethered on said non-elastic cord when a user holds onto said rigid tube with one hand and stretches said elastic cord member from said elastic and non-elastic cord retaining member and suddenly releases said elastic and non-elastic cord retaining member causing said elastic and non-elastic cord retaining member to snap back and impact an end of said rigid tube causing said cat play toy member to fly into the air in a quick and erratic manner.

2. An impact action cat toy as claimed in claim 1 wherein said cat toy play member is constructed of cork and feathers.

* * * * *